United States Patent Office 3,412,049
Patented Nov. 19, 1968

3,412,049
PLASTIC FOAMS AND METHODS OF MAKING
SAME AND COMPOSITIONS USED THEREIN
George T. Gmitter, Akron, Ohio, assignor to The General
Tire & Rubber Company, a corporation of Ohio
No Drawing. Filed May 3, 1965, Ser. No. 452,907
6 Claims. (Cl. 260—2.5)

ABSTRACT OF THE DISCLOSURE

Plastic foams are made in a one-shot process by the protovinylation of divinyl sulfone or comparable polymethylene sulfonyl compound with an active hydrogen material which, at least in part, is a trifunctional active hydrogen compound, e.g., trithiol glycerol, in the presence of a pneumatogen, e.g., trichloro trifluoroethane. The resulting plastic foams may be rigid or flexible of a closed cell type or an open cell type, have a density, for example, of 25–30 kg./m.$^3$ and exhibit high thermal stability.

FIELD OF THE INVENTION

The manufacture of plastic foams has reached a high state of development. This has resulted in the creation of a wide variety of plastic foam products both of the rigid class and of the flexible class. Simultaneous improvement in the quality of known plastic foam products and reduction in their cost of manufacture has led to the use of continually increasing quantities of such products in ever-widening fields of use. However, as in any area of technological growth, new products, improvements in existing products and reductions in cost only serve to increase the insatiable appetite of industrial, agricultural and other users of the products for still further improvements and new innovations. Consequently, although the past decade has brought forth tremendous advancements in the types and qualities of plastic foam products, users of the products have been fast to point out certain shortcomings of the available materials and to suggest new areas of application for plastic foams if new foam products with properties not available in existing materials can be created.

A known deficiency of many types of existing plastic foams, both of the flexible and rigid type, is the tendency towards deterioration of strength, shape or other qualities of the product due to exposure to heat or light, chemical reaction with ozone or oxygen or other detrimental factors. Such deterioration can be so extensive that the plastic foam substantially disintegrates within a few years even under the mild heat, light and oxidation conditions experienced in very normal end use of the product. Since plastic foams are commonly employed as secondary construction materials, e.g., resilient pads in upholstered seats, insulation material in household appliances and buildings, such deterioration of the plastic foam is doubly serious because costs of replacement far exceed the base cost of the foam material itself.

Another impediment to growth and utilization of plastic foam materials has been the lack of a total combination of qualities required by certain environments or proposed methods of use of plastic foams. For example, some possible applications of foam products have required relatively low apparent densities along with ability to resist attack by organic solvents, hydrocarbon vapors, sea water or other corrosive materials, plus the ever present necessity of ability to withstand substantial variations in temperature without wide change in strength, resiliency or other physical properties, resistance to heat and light deterioration and the like. Many known foam products can be used only in a narrow range of ambient temperatures and related conditions and fail to provide attractive combinations of properties under adverse conditions such as low or high relative temperatures, environments containing hydrocarbon vapors or the like. The environment created in the motor compartment of a modern automobile or motor yacht affords an example of the rapid and wide changes in temperature conditions, exposure to destructive atmospheres and other adverse effects which may be imposed upon foam products present in such compartments.

Historically, foam products of solid polymeric materials have been produced in several basic ways. The beating of air or other gas into a liquid system constitutes one basic category of plastic foam production, e.g., the production of whipped cream or the beating method for forming foam rubber. A second method is to form a solid product by the reaction of two or more reagents, which, in addition to a solid matrix material, produce a gas which is entrapped within the resulting solid matrix causing it to expand into a foamed final product. Typical of this class of foam production is the formation of fire fighting foam from carbon dioxide producing reagents and the production of polyurethane foams which have attained great commercial significance during the last decade.

Another basic method of making solid foam products is to enclose solid particles in a matrix of polymer material and then dissolve the solid particles in a suitable solvent, leaving the plastic matrix with the host of voids formerly occupied by the dissolved particles. Typical of this class of foam production is the manufacture of regenerated cellulose sponges. A still further basic method of foam production is to encase small hollow spheres or other hollow particles in a matrix of solid plastic material to create a product of much lower apparent density than the matrix material per se, the hollow particles being crushed or otherwise disintegrated if desired, particularly where a flexible or resilient foam material is required.

Another basic method and perhaps most widely used, of forming foam products from polymeric compositions is to employ pneumatogens to create gas in the polymeric composition at some suitable stage in the formation of the foam product to provide proper blowing action for the formation of the desired foam structure. These pneumatogens, i.e., gas producing materials, may be chemical agents which decompose under heat or other conditions encountered in the production of the foam structure or low boiling liquids or compressed gases which vaporize under the pressure and temperature conditions encountered in the foam structure production to produce proper blowing action. The term "pneumatogen" as hereinafter used in the specification and the annexed claims means a chemical substance capable of being incorporated in a liquid polymeric composition in a condensed form, which substance is further capable solely by increase in temperature to create gas under pressure at discrete separated points within the plastic composition to provide a blowing action upon the plastic composition creating bubbles or similar voids in the composition and thereby creating a foam of the plastic composition. The term includes chemical blowing agents, either solids or liquids, which chemically decompose on application of heat forming decomposition products at least one of which is a gas and low boiling liquids or liquefied gases which, upon elevation of the temperature, are transformed into a gas. The formation of plastic foams with chemical blowing agents or other pneumatogens and examples of various classes of pneumatogens are widely discussed in patents and technical literature, e.g., see U.S. Patents 2,848,427; 2,878,194; 3,066,106 and 3,095,387.

A wide variety of polymeric materials have been used as the base from which the solid matrix for flexible and rigid foams have been formed. Historically, rubber and regenerated cellulose are prime examples of polymeric materials employed in the formation of foam structures. They are still widely used, but new polymer materials have been utilized to prepare foam products of different or improved properties. This has made possible a tremendous expansion in utilization of foam materials in the automotive industry, building construction and other fields. Examples of polymer materials used in this manner can be broadly subdivided into the permanently thermoplastic or uncured category and the non-thermoplastic or cured category. Typical examples of the thermoplastic category include cellulose esters, polyolefins, vinyl chloride polymers, acrylic ester polymers and the like. Typical examples of the non-thermoplastic materials include phenol-aldehyde resins (see U.S. 2,728,741), vulcanized rubber (see U.S. 2,486,782), polyurethanes (see U.S. 2,779,689), and polysulfide rubbers (see U.S. 3,095,387). The thermoplastic category of polymeric materials may be modified by cross-linking agents so as to have a lower degree of thermoplasticity, e.g., polystyrene cross-linked with divinyl benzene (see U.S. 3,066,106).

The present invention concerns foam products of polymeric compositions of the thermoplastic category including easily fusible thermoplastic compositions and difficultly fusible compositions prepared by cross-linking in the ultimate polymer matrix of the foam structure.

A great percentage of thermoplastic polymer materials are made by so-called "addition polymerization," i.e., the combining of a plurality of vinyl groups or other unsaturated organic groups into a repetitive chain forming a polymer molecule (see "Encyclopedia of Chemical Technology," vol. 10, page 960). Non-thermoplastic materials may also be made by this type of polymerization by inclusion of reactants containing three or more unsaturated groups.

Both type polymers, but particularly thermosetting polymers, are also produced by so-called "condensation polymerizations," i.e., combining of the same or a plurality of different chemical reagents having two or more reactive groups which react to form polymer chains with the elimination of water or other reaction product (see "Encyclopedia of Chemical Technology," vol. 10, page 961). Nylon, polyester resins and phenolaldehyde resins are typical examples of polymer materials made by condensation polymerization.

The present invention relates to a third category of polymer formation identified as protovinylation. The term "protovinylation" as used in this specification and the annexed claims means a reaction in which two separate chemical reagents react to form a molecule which is the combination of both reagents without the elimination of any by-products, one of the reagents containing a methylene group, particularly a vinyl group, adjacent in the reagent molecule to a polar group which activates the methylene group and an active hydrogen compound as hereinafter defined. Protovinylation results in the formation of a new molecule by the combination of the two separate reagents as indicated, one being an active hydrogen compound supplying hydrogen as the donor and the other reagent containing a methylene group acting as an acceptor producing a combined molecule according to the following general formula:

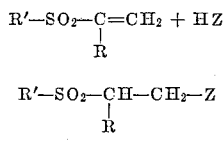

Protovinylation can result in formation of simple molecules, but is of particular interest in connection with the present invention in the formation of polymers of high molecular weight to give normally solid products, both thermoplastic and non-thermoplastic. The term "protovinylation catalyst" as used hereinafter means a material which, when present in small amounts, promotes such protovinylation reactions.

The term "active hydrogen compound" as used in this specification and the annexed claims means a compound containing at least one active hydrogen group as determined by the Zerewitinoff method (see U.S. 3,055,845).

OBJECTS

A principal object of the present invention is the provision of new forms of foam products made of plastic compositions which products have good resistance to heat, light and chemical reagent deterioration and desirable combinations of other useful chemical and physical properties not attainable in plastic foam products known heretofore. Further objects include:

(1) The provision of new methods for the production of plastic foam products, both of a flexible and rigid category.

(2) The provision of new liquid compositions which may be fabricated by simple techniques into flexible or rigid foam structures.

(3) The provision of new methods for preparing new forms of plastic foam products, both of a closed cell type and an open cell type.

(4) The provision of liquid compositions comprising a methylene compuond and an active hydrogen compound capable of inter-reaction to form high molecular weight solid products capable of further cure after being transformed into a foam structure by a blowing action of a gas producing agent contained as an ingredient in the liquid composition.

(5) The provision of such liquid compositions containing unique combinations of foam stabilizers from which liquid foam structures may be formed having a high degree of dimensional stability enabling the foamed product to be maintained at elevated temperatures to complete protovinylation of the ingredients in the foam structure and produce a final cured thermally stable foam product.

(6) The provision of new methods for utilizing prior known polymeric compositions based upon divinyl sulfone and active hydrogen compounds in order to provide a new category of plastic foam products.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the provision of a liquid composition comprising in combination the following ingredients:

(a) An active organic hydrogen compound as hereinbefore defined, (b) An unsaturated sulfonyl compound of the formula:

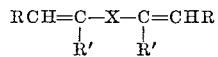

wherein

R and R' are selected from the group consisting of hydrogen, alkyl, aryl and cycloalkyl containing up to 18 carbon atoms, X is selected from the group consisting of —SO$_2$— and —SO$_2$—R''—SO$_2$—, and R'' is selected from the group consisting of alkylene, cycloalkylene and arylene containing up to 8 carbon atoms, (c) A catalytic amount of a protovinylation catalyst as hereinbefore defined, and (d) A pneumatogen as hereinbefore defined.

The objects are further accomplished by a method of making articles of foam plastic material by applying the liquid mixture as broadly described above to a supporting surface, causing the pneumatogen to generate gas and permitting the mixture to expand under the blowing action of said gas and causing solidification of the resulting mass through protovinylation of the active hydrogen compound and the sulfonyl compound as previously stated. Advantageously, the gasification of the pneumatogen and the protovinlyation is accomplished by heating the foamed liquid mixture after application to the supporting surface to an elevated temperature, preferably a temperature between 30 and 300° C. and especially between 50 and 250° C.

The success of the present invention is due in part to the discovery of new compositions comprising in combination a liquid mixture of an organic compound containing at least two active hydrogen-containing groups, a dimethylene sulfonyl compound having the formula designated above, a catalytic amount of a protovinylation catalyst and a pneumatogen. Preferred compositions for use in forming the new foam plastic materials of the invention comprise:

(a) An alkylene polythiol having a molecular weight between 94 and about 5000 containing between 2 and 4 thiol groups, (b) A dimethylene sulfone of the formula:

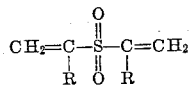

wherein any R which is not hydrogen is an alkyl group containing 1 to 18 carbon atoms, (c) An organic liquid unreactive with components (a) and (b) having a boiling point up to about 100° C., and (d) A polyalkyl siloxane.

Such mixture will contain about $2/n$ mols of component (a) for each mol of component (b), where "$n$" is the number of thiol groups in said alkylene polythiol, between about 1:2 and 2:1 parts of component (c) for each part of component (b) and between about 0.01 to 10% by weight of component (d).

Advantageously, divinyl sulfone is used as the dimethylene sulfonyl compound of the plastic foam producing compositions and a combination of a dithiol and a trithiol is used as the active hydrogen containing group component. A preferred composition made from this combination of materials would comprise:

(a) Divinyl sulfone, (b) A dithiol containing only carbon, hydrogen and sulfur atoms and containing between 2 and 20 carbon atoms, (c) A trithiol containing only carbon, hydrogen and sulfur atoms and containing between 2 and 20 carbon atoms, (d) An organic compound unreactive with components (a) and (b) having a boiling point between about 10 and 100° C., (e) An alkylene polyamine containing only carbon, hydrogen and nitrogen atoms and containing between 2 and 12 carbon atoms.

Such mixture will contain about 50 to 95 mols of component (b) and X mols of component (c) for each 100 mols of component (a), where $X = 100 - y$ and $y =$ the number of mols of component (b), and said mixture further advantageously contains between about 1:2 and 2:1 parts of component (d) for each part of component (a) and between about 0.01 to 1% by weight of said component (e).

EXAMPLES

A more complete understanding of the new methods, compositions and products of this invention may be obtained by reference to the following working examples of compositions and operations in accordance with the invention. In these examples and throughout the remaining specification and claims, all parts and percentages are by weight unless otherwise specified.

Example 1

A rigid plastic foam was prepared from the following materials and in the amounts indicated:

| | Parts |
|---|---|
| Divinyl sulfone | 100 |
| Pentanedithiol-1,5 | 89 |
| Trithiol glycerol | 11.5 |
| Heptane | 65 |
| N,N,N',N'-tetramethylbutane diamine-1,3 | 0.3 |
| Polysilicone oil [1] | 1.3 |
| Polydimethyl siloxane [2] | 0.6 |

[1] Trademark product "L520."
[2] 500 centistokes xiscosity polymers.

All of the listed ingredients, with the exception of divinyl sulfone, were homogeneously mixed together at room temperature (15–20° C.) and this mixture was charged into one of two tanks in a dispensing apparatus capable of metering liquids from two storage tanks to a single mixing head wherein two separate liquids are homogeneously blended as they are dispensed through the head. The divinyl sulfone was charged into the second tank of the apparatus and the liquid mixture from the first tank and the divinyl sulfone from the second tank were forced under small pressure (about 2–10 p.s.i.) and at room temperature to rapidly mix in the mixing head and discharge from the head on to the top surface of a belt traveling beneath the mixing head. The metering of the liquids from the two tanks was controlled so that the two tanks emptied simultaneously and with the proportions of the materials being mixed remaining constant throughout the dispensing operation.

The belt supporting the homogeneously mixed foam composition passed into a hot air oven in which the mixture was subjected to a temperature of 45–50° C. for approximately 10 minutes, i.e., the time required for the mixture to enter and leave the oven. In this passage through the oven and heating, the heptane contained in the plastic mixture was caused to expand and blow the plastic matrix into a rigid foam created by polymerization and cross-linking reactions between the divinyl sulfone, the dithiol and trithiol components of the mixture. A hardened plastic foam having a density of about 30 kg./m.³ was produced.

Example 2

A rigid plastic foam was prepared from the following materials and in the amounts indicated:

| | Parts |
|---|---|
| Diisopropenyl sulfone | 100 |
| Nonamethylene dimercaptan | 81.5 |
| Diethylene triamine | 29 |
| Polysilicone oil [1] | 1.7 |
| Polydimethyl siloxane [2] | 0.8 |
| Triethylene diamine | 0.1 |
| Methyl ethyl ketone | 85 |

[1] Trademark product "L520."
[2] 500 centistokes viscosity polymer.

Except for the diisopropenyl sulfone, all of the ingredients are mixed together at room temperature in a suitable container and when a homogeneous mixture was obtained, the diisopropenyl sulfone was added and mixed rapidly with the homogeneous blend. This was accomplished in less than two minutes and the liquid mixture was then poured into a long flat pan, the liquid mixture being quickly distributed across the bottom of the pan to give level distribution. Then the pan and its contents were inserted into a hot air oven maintained at a temperature of 45–50° C. and were allowed to remain in this oven for approximately ten minutes. The methyl ethyl ketone contained in the mixture was caused to expand by the heat in the oven and to blow the plastic matrix into a rigid foam created by the polymerization and cross-linking reactions between the diisopropenyl sulfone, the dimercaptan and the triamine. A loaf of hardened plastic foam from which the bowed top and side crusts were removed with a band saw leaving a rectangular slab of rigid plastic foam having an apparent density of about 25 kg./cm.

Example 3

A foam utilizing a mixture of a dithiol and a trithiol with cross-linking achieved with divinyl sulfone and Freon as a blowing agent was prepared using the following materials:

|  | G. |
|---|---|
| Divinyl sulfone (0.05 mole) | 5.9 |
| Trithiol glycerol (0.0125 mole) | 1.75 |
| Nonamethylene dithiol (0.0375 mole) | 7.2 |
| Freon 113 ($C_2Cl_3F_3$) | 7.5 |
| "L–520" (a siloxane oxyalkylene block copolymer) | 0.2 |
| "DC–200" (a polydimethyl siloxane of 500 ctsks. viscosity) | 0.1 |
| N,N,N',N'-tetramethylbutane diamine-1,3 | 0.05 |

The components grouped in A above were mixed together at room temperature in a suitable container. The "Freon 113", "L–520" and "DC–200" silicones were then added and mixed in with the A mixture above. The amine catalyst was then added and rapidly mixed in with the other previously mixed components.

The mixture frothed with a maximum exotherm of 95° C. resulting. The foam was then cured at 100° C. for 30 minutes. On cooling to room temperature, the foam was tough, rigid with a density of about 320 kg./cm.

In another case, a telechelic polymer having dimercapto end group functionality (a polybutadiene dithiol of some 5000 mol. weight) was used in place of the nonamethylene dithiol in an equivalent molar proportion.

DISCUSSION OF DETAILS

A wide variety of materials can be used as the active hydrogen compound for use in accordance with the invention. Broadly, useful active hydrogen compounds include polyhydroxy alkanes, primary or secondary amines, phenols, thiophenols, thiols, and carboxylic compounds. Specific examples of materials in this general category which may be advantageously used in accordance with the invention include: ethylene glycol; tetramethylene glycol; polytetramethylene glycol; resorcinol; bisphenol-A; glycerol; 1,2,6-hexanetriol; trimethylene dithiol; "Thiokol" polysulfide resins; polyesters having two or more hydroxyl end or middle groups; polypropylene glycols of 2000 mol. wt. (e.g., "PPG 2025"); a propylene oxide adduct of glycerol of about 3000 mol. wt. (e.g., "LG–56" triol); "Polyol 112–3"; "LHT–240" triol; diethylene triamine; triethylene tetramine; hexamethylene diamine, and polyether backbone structures having two or more amine end groups.

A dimethylene sulfonyl compound as hereinbefore defined is another essential material for use in producing the new foam systems of this invention. Divinyl sulfone is a preferred material but other sulfone activated ethylene compounds may be employed, advantageous examples including diisopropenyl sulfone; distyryl sulfone; 1,2-bis (vinyl sulfonyl) ethane; bis (α-hexyl vinyl) sulfone; bis (α-phenyl vinyl) sulfone; bis (α-cyclohexylvinyl) sulfone; bis (α-stearyl vinyl) sulfone; bis (vinyl sulfonyl) methane; bis (vinyl sulfonyl) hexane; 1,4-bis (vinyl sulfonyl) cyclohexane, and 2,5-bis (vinyl sulfonyl) toluene.

The amines and mercaptans are most reactive to the sulfone compounds. With these active hydrogen components, the protovinylation can be advantageously carried out at temperatures as low as 25° C. The phenols, glycols, triols and dicarboxylic acids are less reactive and higher temperatures would advantageously be employed with these components, e.g., 25° C. to 65° C. A major portion of the active hydrogen compound component will be difunctional with a minor amount of trifunctional active hydrogen compound to provide cross-linking. Advantageously, the active hydrogen compound ingredients of the reaction mass will comprise 80 to 99% difunctional material and 1 to 20% trifunctional or higher functional active hydrogen compound.

The molecular weights of the active hydrogen compounds advantageously will be from 100 to 5000. Such compounds with molecular weights of 700 or below will create rigid foams while compounds having molecular weights above 700 provide less rigid or flexible foams, the rigidity of the foams generally decreasing as the molecular weight of the active hydrogen compound increases.

The amount of active hydrogen compound employed will be at least an equivalent weight of the divinyl sulfone or other sulfonyl compound. Equivalent weight in this respect means the molecular weight of the compound divided by the number of active hydrogen groups or vinyl groups. Advantageously, the sulfonyl compound may be employed in up to a 5 mole percent excess. Larger excesses of the sulfonyl compound could be employed, but the cost of these materials may be a deterring factor in the use of such excess.

As catalysts for promoting the protovinylation reaction between the sulfonyl compound and the active hydrogen compound, one may advantageously use any base or alkali which is unreactive with divinyl sulfone or the other sulfonyl compound. Examples of materials which may advantageously be used for this purpose include quaternary ammonium hydroxides, alkali and alkaline earth metals and their salts, e.g., sodium hydroxide, sodium hydride, potassium carbonate and the like and tertiary amines. Sodium metal finely dispersed in an inert solvent such as heptane is a specific example of a combination of catalyst and blowing agent.

Low boiling organic liquids such as low molecular weight hydrocarbons and halocarbons may be advantageously used as pneumatogens in accordance with the invention, e.g., pentane, hexane, acetone, methylene chloride, trichlorofluoromethane and the like. As blowing agents, one may also employ liquefied or compressed gases, e.g., propane, nitrogen, trimethylamine or air. Advantageously, mixtures of such low boiling liquids or gases may be used to provide the proper degree of blowing action for the foaming. Chemical blowing agents which decompose upon application of heat to generate gas may also be used, examples of such materials being known to those in the art of plastic foam production and are exemplified in the patents referred to hereinbefore.

Flexibility or rigidity in the final plastic foam products may be adjusted by the selection of active hydrogen compounds of suitable molecular weights and the proportions of difunctional components relative to trifunctional or higher functional active hydrogen compounds used in the reaction mixtures.

Foam stabilizers such as the alkyl cellulose derivatives, silicone oils, "L–520" silicone, metal stearates, polyalkylvinyl ethers, finely divided silica, emulsifiers, etc., may need be incorporated in the formulations.

The addition of plasticizers, fillers, reinforcing agents and antioxidants may be used to modify and/or preserve the desired properties. Antioxidants are recommended where unsaturated or other easily oxidizable moieties are present in the backbones of reactive hydrogen compounds. Such materials can be used in an amount up to 20% by weight of the total composition and preferably between 0.01 and 10%.

Other olefinic monomers may be incorporated with an excess of the sulfone derivatives to provide additional modification. A proper catalyst for such copolymerization, e.g., persulfates, may also be incorporated in these instances.

Depending upon the particular sulfone and polyhydric component used, as well as the catalyst, the entire formulation may be mixed under pressure and discharged immediately or after some reaction between the principal components has taken place.

The nature of the polyhydric component and/or the catalyst or the presence of some active hydrogen component in the various additives and stabilizers may require the separate mixing of related components and bringing the individual components in the desired ratios together to a common mixing head so that subsequent reaction may ensue upon leaving the mixing chamber.

Mixing should be completed as rapidly as possible so that the mixture can be discharged within a reasonable time. Suitable mixing equipment is commercially available and such equipment which is known to be useful for producing one-shot polyurethane foams may be advantageously employed.

CONCLUSION

There has been described above new forms of plastic foams and methods for their production. The invention makes possible a new class of rigid or flexible foams having certain properties not available in plastic or elastomeric foams known heretofore. The description of the invention has included reference to liquid compositions composed of a unique combination of foam stabilizers with active hydrogen compounds and unsaturated sulfonyl compounds capable of being transformed at elevated temperatures into liquid foam structures having a high degree of dimensional stability which will remain in a foamed product condition until complete reaction of the plastic producing materials has taken place to create final cured and thermally stable foam products.

I claim:
1. A one-shot method of making an article of foamed plastic material which comprises homogeneously admixing:
   (a) an active hydrogen compound having two active hydrogen containing groups selected from the group consisting of dithiols formed only of carbon, hydrogen and sulfur atoms having a molecular weight between 94 and 5000, primary diamines and secondary diamines, said diamines formed only of carbon, hydrogen and nitrogen and having a molecular weight from 100 to 5000,
   (b) an active hydrogen compound having three active hydrogen containing groups selected from the group consisting of trithiols formed only of carbon, hydrogen and sulfur atoms having a molecular weight between 94 and 5000, primary triamines and secondary triamines, said triamines formed only of carbon, hydrogen and nitrogen and having a molecular weight from 100 to 5000,
   (c) an unsaturated sulfone of the formula:

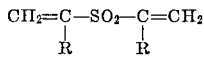

wherein R is hydrogen or alkyl containing 1 to 18 carbon atoms,
   (d) a halohydrocarbon having a boiling point between about 10 and 100° C.,
   (e) a protovinylation catalyst selected from the group tertiary amines and quaternary ammonium hydroxides,
   (f) said mixture containing about 50 to 95 mols of component (a) and X mols of component (b) for each 100 mols of component (c), where $X=100-y$ and $y=$the number of mols of component (a), between about 1:2 and 2:1 parts of component (d) for each part of component (c) and between about 0.01 to 1% by weight of component (e),
   (g) promptly applying the resulting liquid mixture to a supporting surface,
   (h) causing component (d) to generate gas, and
   (i) permitting the mixture to expand under the blowing action of the gas and solidify as a result of reaction of components (a), (b) and (c).

2. An article of foamed plastic material as made by the method of claim 1.
3. A composition for use in the manufacture of foamed plastic material which comprises a liquid mixture of the following ingredients:
   (a) an active hydrogen compound having two active hydrogen containing groups selected from the group consisting of dithiols formed only of carbon, hydrogen and sulfur atoms having a molecular weight between 94 and 5000, primary diamines and secondary diamines, said diamines formed only of carbon, hydrogen and nitrogen and having a molecular weight from 100 to 5000.
   (b) an active hydrogen compound having three active hydrogen containing groups selected from the group consisting of trithiols formed only of carbon, hydrogen and sulfur atoms having a molecular weight between 94 and 5000, primary triamines and secondary triamines, said triamines formed only of carbon, hydrogen and nitrogen and having a molecular weight from 100 to 5000,
   (c) an unsaturated sulfone of the formula:

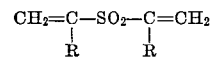

wherein R is hydrogen or alkyl containing 1 to 18 carbon atoms,
   (d) a halohydrocarbon having a boiling point between about 10 and 100° C.,
   (e) a protovinylation catalyst selected from the group teritary amines and quarternary ammonium hydroxides,
   (f) said mixture containing about 50 to 95 mols of component (a) and X mols of component (b) for each 100 mols of component (c), where $X=100-y$ and $y=$the number of mols of component (a), between about 1:2 and 2:1 parts of component (d) for each part of component (c) and between about 0.01 to 1% by weight of component (e).

4. A one-shot method of making an article of foamed plastic material which comprises homogeneously admixing:
   (a) a dithiol containing only carbon, hydrogen and sulfur atoms and containing between 2 and 20 carbon atoms,
   (b) a trithiol containing only carbon, hydrogen and sulfur atoms and containing between 2 and 20 carbon atoms,
   (c) divinyl sulfone,
   (d) a halohydrocarbon having a boiling point between about 10 and 100° C., and
   (e) an alkylene polyamine containing only carbon, hydrogen and nitrogen atoms and containing between 2 and 12 carbon atoms,
   (f) said mixture containing about 50 to 95 mols of component (a) and X mols of component (b) for each 100 mols of divinyl sulfone, where $X=100-y$ and $y=$the number of mols of component (a), between about 1:2 and 2:1 parts of component (d) for each part of divinyl sulfone and between about 0.01 to 1% by weight of component (e),
   (g) promptly applying the resulting liquid mixture to a supporting surface,
   (h) causing component (d) to generate gas, and
   (i) permitting the mixture to expand under the blowing action of the gas and solidify as a result of reaction of components (a), (b) and (c).

5. A method of making a sheet of rigid plastic foam having a density about 0.3 gm./cc. which comprises:
   (a) mixing together at about 15–20° C. the following ingredients in approximately the parts specified:

| | Parts |
|---|---|
| (1) Divinyl sulfone | 100 |
| (2) Trithiol glycerol | 300 |
| (3) Nonamethylene dithiol | 120 |

(b) then admixing with the resulting mixture the following ingredients in approximately the parts specified:

|  | Parts |
|---|---|
| (1) Trichloro trifluoroethane | 125 |
| (2) Siloxane oxyethylene block copolymer | 3.4 |
| (3) Polydimethyl siloxane | 1.7 |

(c) thereafter rapidly and uniformly admixing with the mixture of ingredients aforesaid 0.85 part of tetramethylbutane diamino-1,3 and promptly dispensing the mixture in the form of a thin ribbon onto a supporting surface, (d) permitting the mixture to expand into a sheet of plastic foam by blowing action of gas created by exothermic heat, (e) curing the foam by heating it for 30 minutes at 100° C., (f) cooling the foam to ambient temperature, and (g) removing the resulting tough, rigid foam from the supporting surface.

6. A composition for use in the manufacture of foamed plastic material which consists essentially of a liquid mixture of the following ingredients in the parts by weight specified:

|  | Parts |
|---|---|
| (1) Divinyl sulfone | 100 |
| (2) Trithiol glycerol | 300 |
| (3) Nonamethylene dithiol | 120 |
| (4) Trichloro trifluoroethane | 125 |
| (5) Siloxane oxyethylene block copolymer | 3.4 |
| (6) Polydimethyl siloxane | 1.7 |
| (7) Tetramethyl butane diamino-1,3 | 0.85 |

References Cited

UNITED STATES PATENTS

| 2,623,035 | 12/1952 | Schappel. |
| 3,228,912 | 1/1966 | Demmler et al. |
| 3,234,189 | 2/1966 | Tashlick et al. |
| 3,234,190 | 2/1966 | Tashlick. |
| 3,311,574 | 3/1967 | Bowering et al. 260—2.5 |

GEORGE F. LESMES, *Primary Examiner.*

J. C. BLEUTGE, *Assistant Examiner.*